Figure 1:
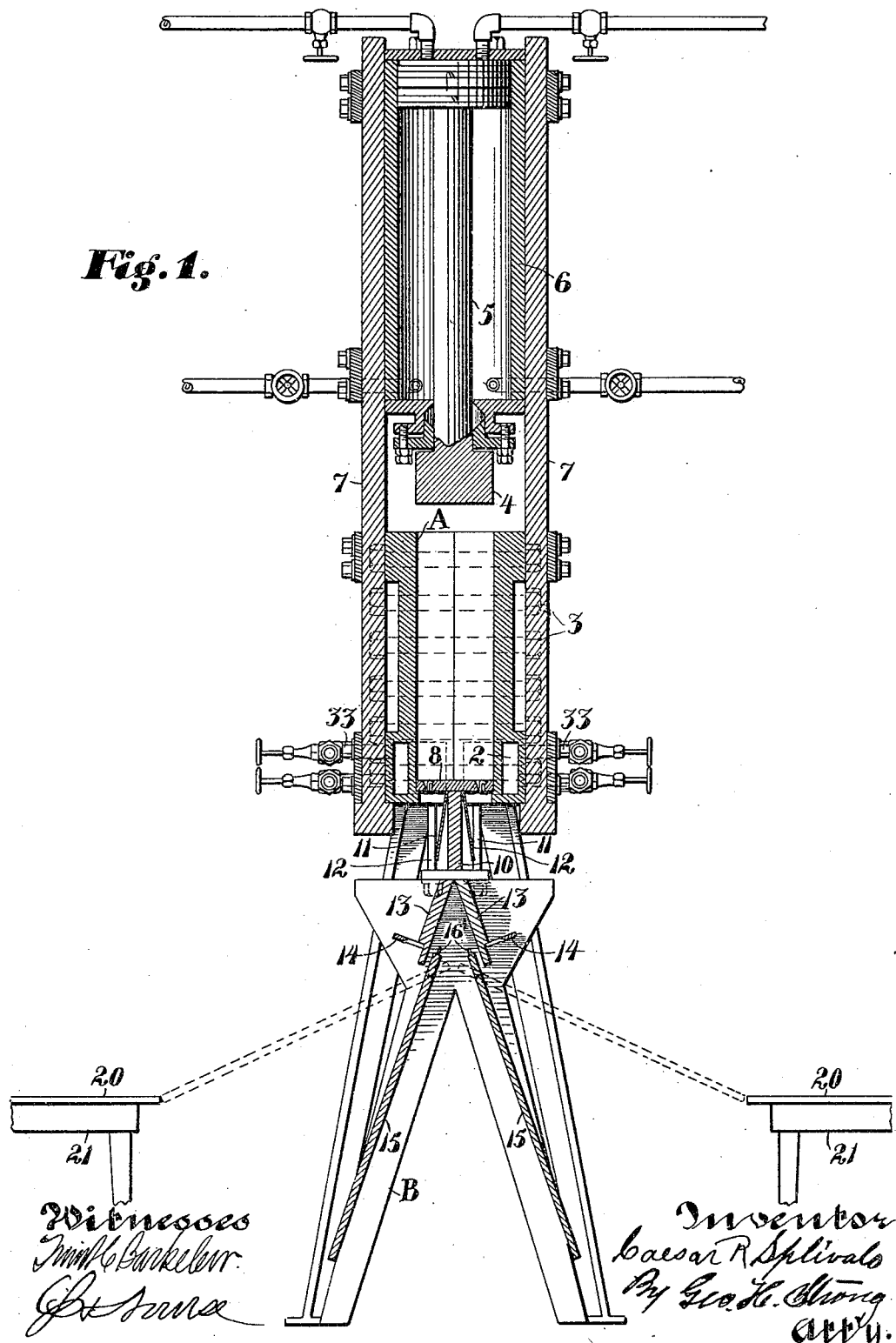

No. 807,972.  
C. R. SPLIVALO.  
PASTE PRESS.  
APPLICATION FILED APR. 24, 1905.
PATENTED DEC. 19, 1905.
3 SHEETS—SHEET 3.
Fig. 3.
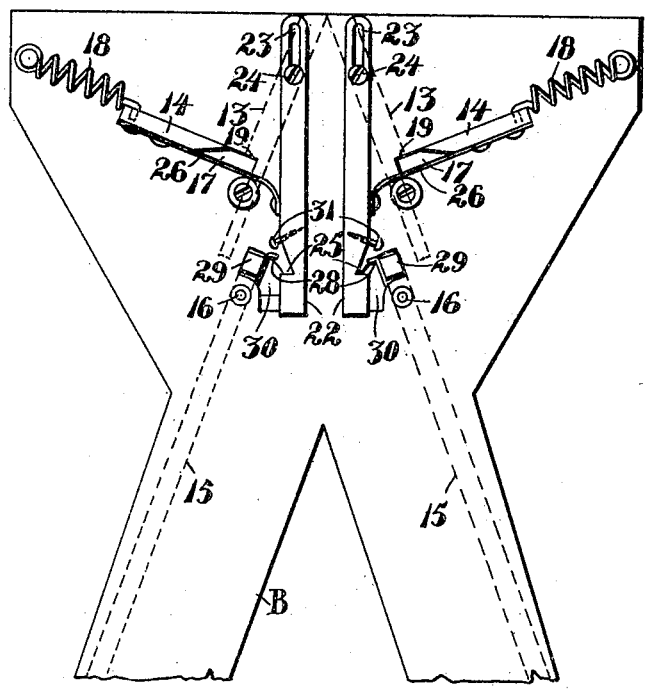
Fig. 4.
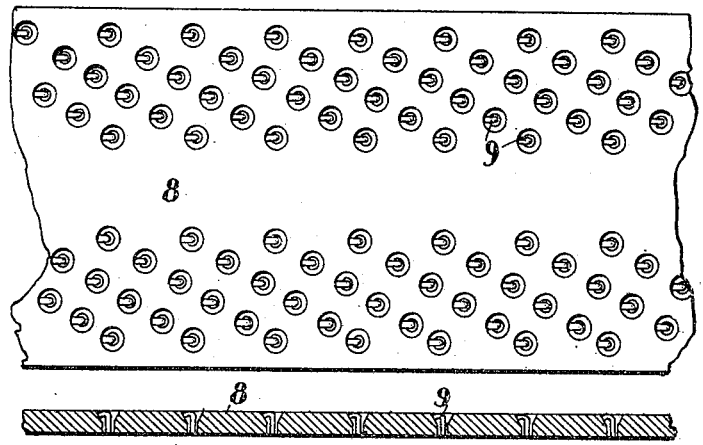
Fig. 5.
Witnesses  
Inventor  
Caesar R. Splivalo  
By Geo. H. Strong  
Attorney

UNITED STATES PATENT OFFICE.

CAESAR R. SPLIVALO, OF SAN FRANCISCO, CALIFORNIA.

PASTE-PRESS.

No. 807,972.　　　　Specification of Letters Patent.　　　　Patented Dec. 19, 1905.

Application filed April 24, 1905. Serial No. 257,243.

*To all whom it may concern:*

Be it known that I, CAESAR R. SPLIVALO, a citizen of the United States, residing in the city and county of San Francisco, State of California, have invented new and useful Improvements in Paste-Presses, of which the following is a specification.

My invention relates to improvements in presses used in the preparation of macaroni and like paste products.

It is customary in the present state of the art to employ a steam-jacketed cylinder, into which the paste in bulk is delivered and by power to force the paste through suitable dies in the bottom of the cylinder to form tubes, strings, or strips, which on being dried form the macaroni, vermicelli, and other dried paste products of commerce. The press-cylinder being round, the heat of the steam in the surrounding jacket penetrates inwardly on all sides to heat the paste to give it its required degree of plasticity and mobility; but as the penetrating power of the heat is limited generally to about four inches in any one direction the capacity of these round presses is reduced accordingly. Where it is attempted, as it sometimes is, to make the press-cylinder much over eight inches in diameter, the interior portions of the paste are found to be more or less unaffected by the heat, resulting in an inferior product. Moreover, the steam in these cylindrical presses acting unequally on the body of paste causes parts of it to flow out through the dies more rapidly than other portions, thereby producing tubes of different length. The operator from time to time cuts off a bundle of these exuded paste tubes, which are by subsequent handling rearranged in rows in single layers on the drying-trays.

My invention comprehends the constructing of a press-box with a bore which in cross-section shall have a major axis of indefinite length and a minor axis of a length not to exceed the distance to which steam may penetrate from opposite sides of the press-box. In other words, I may have a press-box oval or oblong in cross-section, and the major axis or space between the ends of the oval or oblong may be from two to six feet or more, while the minor axis or the space between the side walls of the box will not exceed, say, eight inches where the effective penetrating power of the steam from either side does not exceed four inches. The result of this construction is the more thorough and equable heating of all the contained paste to cause it to flow through the dies evenly and also the production of a machine of greatly-increased capacity over those now employed. Furthermore, by providing a die corresponding in shape to the bottom of the press-box and having suitably-staggered perforations and by arranging suitable spreading and cutting mechanism underneath the cylinder I am able to take the tubes as they come from the die, spread them directly onto the trays or onto sheets of paper to be slid onto the trays ready for drying without the expense and loss of time of a second or third handling.

Figure 2:
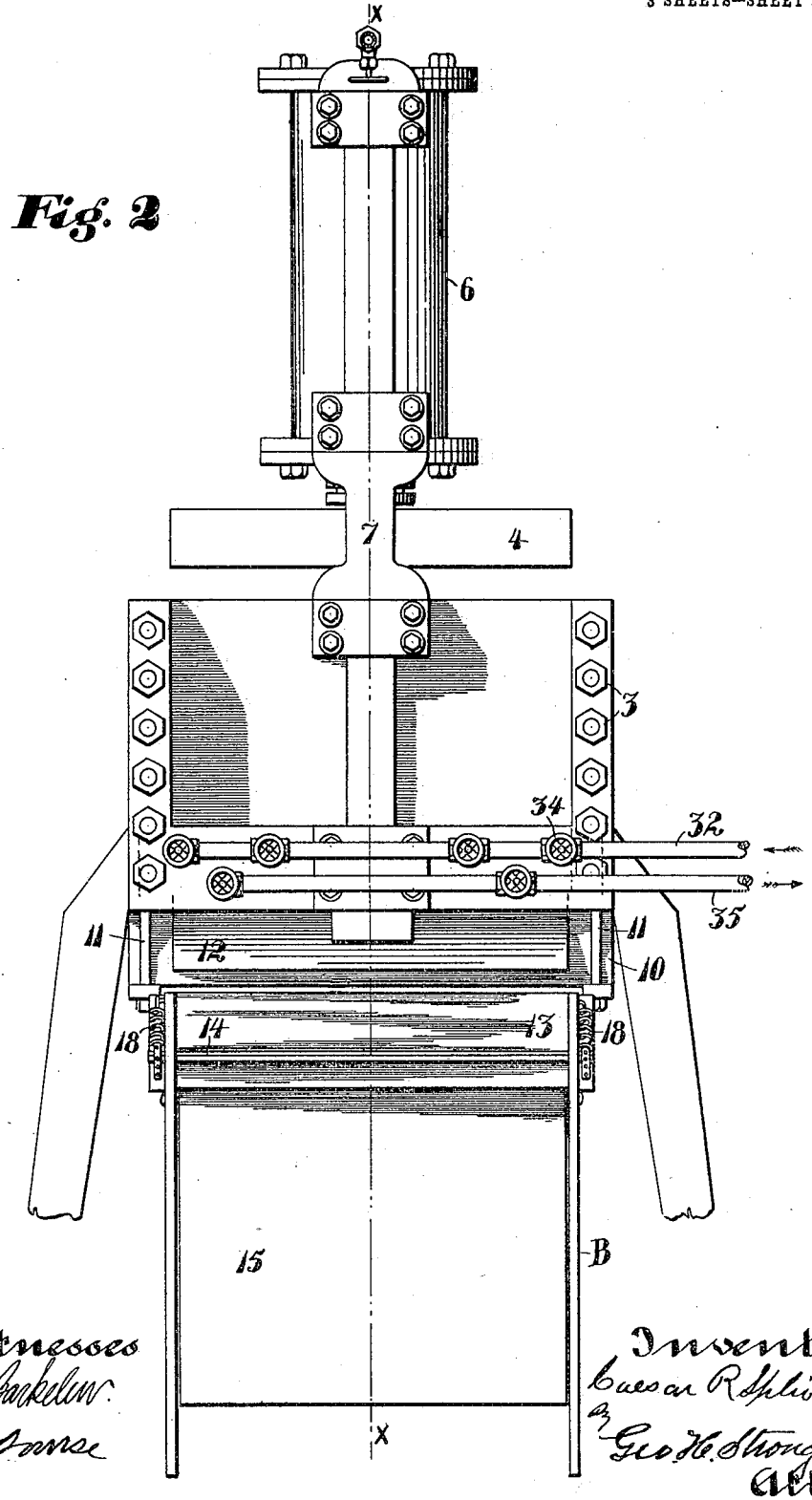

Having reference to the accompanying drawings, Figure 1 is a vertical section taken longitudinally through my apparatus on line X X, Fig. 2. Fig. 2 is a side elevation of the same. Fig. 3 is an end elevation of the spreading and cutting mechanism. Fig. 4 is a plan of a die. Fig. 5 is a section of the same.

A represents my improved impression-cylinder or press-box, here shown as having a bore oblong in cross-section with a steam-jacket 2 adjacent to its end and on its longer sides only. The space between the longer sides of the box is less than twice the effective penetrating distance of the steam from the jacket on either side. Hence no end jacket is necessary, thereby lessening the cost of construction, while the sides of the box may be prolonged to any suitable length within the power of the compression means. Preferably the box is made in two sections adapted to be assembled and bolted together by the bolts 3, as shown.

4 is a plunger corresponding in shape and area to the bore of the box. It is carried by the piston-rod 5, operated by any suitable means, as the hydraulic cylinder 6. The latter is suitably mounted above and connected rigidly with the press-box by means of the tie-rods or columns 7. The plunger is adapted to be retracted above the opening in the press to give sufficient clearance for the infeed of the paste.

Power is applied in the usual fashion to reciprocate the plunger to express the contents of the press-box through the perforations in the die 8, which is suitably supported in the bottom of the box. This die is of a construction common to presses of this character and may be provided with any style or shape of perforations desired. As here shown, the perforations are round. A central core 9 is provided in each perforation, which forms the hollow of the paste-tube. The die is supported at its edges by an internal ledge in the bottom of the cylinder and rests on a central and longitudinally-extending brace-plate or strong-back 10, carried from the press by the stirrups 11. This strong-back 10 serves a double purpose: first, to support the die against the thrust of the plunger, and, secondly, to divide the exuded tubes into two parts and to form a support for the inclined boards 12, one of which boards directs part of the tubes to one side of the machine, and the other board directs the remaining tubes to the other side of the machine.

The perforations in the die-plate are preferably arranged and staggered, so that the tubes issuing therethrough will not stand directly one behind another, but will permit the two bundles to be laid out or spread substantially flat in single layers on the receiving surface or surfaces held beneath the die.

The press is preferably mounted on an elevated support to allow plenty of room for the proper handling of the tubes as they come from the die. As here shown, the tubes from either side of the machine are received onto corresponding inclined boards or deflectors 13 and pass beneath the respective knives 14 onto the hinged boards or shelves 15.

The parts 12, 13, 14, and 15, with their coöperating mechanisms, are duplicated, so that it is understood that the description of the portion of the spreading and cutting device for the tubes issuing from one side of the die is the same for that on the other side of the machine. This spreading and cutting device may be mounted on a frame B, capable of being moved in under and out from beneath the cylinder at any time it is desired.

The deflectors 13 are fixed permanently in the frame B, and the boards or shelves 15 are hinged or pivoted in the frame, as shown at 16, and extend up underneath the deflectors 13 and sufficiently out of contact therewith to permit one or more sheets of paper or a tray or other receiving medium to be laid on a hinged board or shelf 15 and pass up underneath a corresponding deflector 13, the tray or paper forming the medium on which the tubes as they hang in long strings from the press are received.

In practice I generally arrange for a number of sheets of paper to be laid on each of the shelves 15, with the upper ends of the sheets passed up through the space between the lower edge of a deflecting-board 13 and its corresponding shelf 15 and secured by suitable means, as the pins or tacks 16', to the upper edge of the shelf. Knowing the number of trays of tubes that a single charge of the press will fill, I provide an appropriate number of sheets of paper for each of the hinged shelves 15, since each sheet is intended to correspond to a tray. The knives 14 are supported in slots 17 in the ends of frame B and have a movement to and from their respective deflecting-boards 12 corresponding with the turning of the boards 15 about their pivots. Each end of each knife is connected to a spring 18, operating normally to hold the knives away from the boards 12. The latter are each preferably cut away to provide a ledge 19, with which the cutting edge of a knife coöperates when moved in against the board to sever a bunch of tubes. The movement of the knives is so related to the movement of the respective hinged shelves 15 that when a bunch of tubes on one side or the other of the machine has gradually been forced out, so that it extends substantially to the bottom of a shelf 15, the latter may be turned on its hinges into a position indicated in dotted lines, Fig. 1, whereupon the corresponding knife 14 will be actuated to sever this particular bunch of tubes, leaving them supported entirely on the shelf 15 or upon a sheet of paper upon the shelf. The severance however, of the bunch preferably does not take place until the shelf has assumed such a flat angle that the tubes will not slide off when the knife comes down. With either of the shelves in the position as indicated in dotted lines, Fig. 1, its incumbent load can be slid onto a tray 20, supported on the table 21, by simply taking hold of the topmost sheet of paper on the shelf and pulling on it until it releases from the pins or tacks 16' or other holding means. With the loaded sheet transferred to the tray 20 the shelf 15 is dropped back into its nearly vertical normal position. The mechanism, however, by which the knife was actuated has previously been released, so that no substantial or prolonged hindrance is interposed to the downward passage of the tubes issuing from the die.

The mechanism by which I effect the coöperation of the knives with the hinged shelves 15 is here shown as follows: Relative to each knife and shelf and at each end of a knife and outside of frame B is a bar 22, having a slot 23 at one end, in which the bar is pivoted, as at 24, to permit of a limited reciprocating movement of the bar, as well as a pivotal movement of the same. The bars 22 are notched, as at 25, and are each connected by a strap 26 or equivalent flexible connection with the adjacent end of a knife. The straps pass over rollers 27, so as to bring a direct pull on a knife when any two bars which are connected to the knife are pulled down by the engagement of the prongs 28 on the lateral projections 29 on a corresponding shelf 15. These projections 29 are here shown comprising the ends of a cross-bar attached to a shelf and extending through and working in segmental slots 30 in the ends of the frame B. The notches 25 are so positioned relative to their corresponding projections 28 that when a shelf is lifted the two bars which are connected to the knife corresponding to this shelf will be pulled down simultaneously to cause that knife to be actuated to sever the bunch of tubes on that side of the machine at the proper moment.

As previously stated, it is desired that the severance of the bunch of tubes will not take place until the shelf has been lifted into about the position indicated in dotted lines in Fig. 1. As soon as the tubes are severed there is no need of the knife remaining longer, so I provide a means by which the knife is released before the shelf has completed its upward movement.

As here shown, screws 31 are carried by the bars and engage the end of a projection 29 on a shelf at the proper moment to push the bars away from the projections 29 and release them from the prongs 28. Some adjustable means, as the screws 31, are desirable, so as to enable the two bars which are connected with a knife to be released simultaneously and cause both ends of the knife to be retracted at the same time. Thus it will be seen that a knife is operated and released by a simple upward movement of a shelf, and the operation of the knife being quite rapid the continued downward feed of the tubes from the die is not interfered with. As a matter of fact the tubes feed out very slowly, and it takes from fifty to sixty minutes to run a charge of paste through the press. By this construction of press-box, spreading, and cutting mechanism one operator is able to handle the entire output of the machine, spread it and deliver it into a tray for drying.

In order to equably heat the steam-jacket or portions of the steam-jacket, I prefer to have the steam-pipe 32 provided with a plurality of inlets 33, each controlled by a separate valve 34. As these inlets enter at different places in the length of the jacket, it is possible to regulate the heat for all portions of the paste, so that all the tubes will be of uniform quality and will flow at a uniform rate of speed.

If it is found that any portion of the tubes does not flow as it should, the cocks 34, controlling the part of the cylinder from which these particular tubes are coming, may be turned on or off to either heat up or cool that part of the paste, as may be needed. Drain from the steam-jacket may take place through the pipe 35.

In operating the press the full pressure of steam is not put on, as this would have a tendency to burn the dough. The drain-pipe valve is always partially open to produce a circulation. I also show and prefer to use a plurality of valves, as this enables me to distribute the heat more uniformly than would a single valve. The inlet-valves are also only slightly open when the press is operating.

In practice I have found the foregoing-described construction to produce a more uniform and superior product than can be obtained under ordinary methods, that the press has a considerably-increased capacity, and that a great saving of time and labor is effected by the die arrangement and the spreading and cutting mechanism.

It is possible that various changes and modifications may be made without departing from the principle of my invention, and I do not wish to be understood as limiting myself to the specific structure here shown and described.

I claim—

1. A paste-press having in combination a cylinder, a plunger to operate therein, means for operating the plunger, a perforated die in the cylinder, and a hinged member below the die upon which the formed tubes are received and held during a subsequent cutting operation.

2. A paste-press having in combination a cylinder, a plunger operable therein, said cylinder having a diameter less than twice the effective penetrating distance of the heating medium applied to the cylinder, means for applying heat externally to the cylinder, a perforated die within the cylinder, means including a hinged member below the die upon which the formed tubes are received, and cutting appliances associated with said tube-receiving means.

3. In a paste-press, a cylinder having a bore of greater diameter in one direction than in the other, a plunger, a die in the cylinder, and a steam-jacket on the longer sides of said cylinder and means for varying the application of a heating medium to different parts of said cylinder.

4. In a paste-press, a cylinder, a plunger, a die in the cylinder and means for regulating the application of heat to different parts of said cylinder.

5. The combination with a paste-press, having a cylinder, a plunger and a perforated die, of means for receiving, spreading and cutting the formed tubes as they issue from the die, said receiving means including a hinged shelf.

6. The combination with a paste-press, having a cylinder, a plunger and a perforated die, of means for receiving, spreading and cutting the formed tubes as they issue from the die, said means including a hinged shelf and a knife operating coördinately with the movements of said shelf.

7. The combination with a paste-press having a cylinder, a plunger, and a perforated die, of a hinged tube spreader and cutter disposed beneath the die and in the path of the discharging-tubes, and having means to receive and sever the tubes.

8. The combination with a paste-press, having a perforated die member, a deflector arranged beneath said die, a hinged holder onto which the tubes are received from the said deflector and a knife.

9. The combination with a paste-press, having a perforated die member, a deflector arranged beneath said die, a hinged holder onto which the tubes are received from the said deflector and a knife, and means for operating said knife coördinately with the movements of said holder.

10. The combination with a paste-press having a perforated die member, of deflectors arranged beneath said die member and dividing the paste product issuing from said member to opposite sides of the machine, a knife relative to each deflector, means for operating said knives and means for holding the severed product.

11. The combination with a paste-press having a perforated die member, of a holder for the tubes arranged beneath said member, said holder being hinged at its upper end, a knife for severing the tubes and means for operating the knife coördinately with the movement of said holder.

12. The combinaton with a paste-press having a die member, of a hinged member to receive the product from said die member, a knife and means operated by said hinged member to actuate the knife.

13. The combination with a paste-press having a die member, of a normally retracted knife operable across the path of the product issuing from said die member, a movable receiver or holder for the product of said die member, and means operable by said receiver to actuate the knife to sever said product.

14. The combination with a paste-press, of a spreader and cutter comprising a hinged receiver member, a spring-retracted knife, and means operated by said hinged member to actuate the knife and to release the knife.

In testimony whereof I have hereunto set my hand in presence of two subscribing witnesses.

CAESAR R. SPLIVALO.

Witnesses:
S. H. NOURSE,
GEO. T. KNOX.